US006169265B1

(12) United States Patent
Dvoskin et al.

(10) Patent No.: US 6,169,265 B1
(45) Date of Patent: Jan. 2, 2001

(54) ELECTRODE FOR PLASMA GENERATOR THE GENERATOR COMPRISING SAME AND PROCESS FOR TREATMENT OF SOLIDIFYING LIQUID METAL

(75) Inventors: Pavel Dvoskin, Kiryat Nordau; Valery Zlochevsky, Netanya; Ran Rosen, Tel-Aviv, all of (IL)

(73) Assignee: Netanya Plasmatec Ltd., Netanya South (IL)

( * ) Notice: Under 35 U.S.C. 154(b), the term of this patent shall be extended for 0 days.

(21) Appl. No.: 09/101,710

(22) PCT Filed: Jan. 16, 1997

(86) PCT No.: PCT/IL97/00023

§ 371 Date: Jul. 16, 1998

§ 102(e) Date: Jul. 16, 1998

(87) PCT Pub. No.: WO97/28672

PCT Pub. Date: Aug. 7, 1997

(30) Foreign Application Priority Data

Jan. 29, 1996 (IL) ........................................................ 116939

(51) Int. Cl.[7] ........................................................ B23K 10/00

(52) U.S. Cl. .................................. 219/121.52; 219/121.48

(58) Field of Search ......................... 219/121.52, 121.48, 219/121.36, 121.59, 121.38; 315/111.21, 111.71; 313/332; 373/88

(56) References Cited

U.S. PATENT DOCUMENTS

| | | | |
|---|---|---|---|
| 2,527,294 * | 10/1950 | Bailey | 313/332 |
| 4,000,361 | 12/1976 | Bondarenko . | |
| 4,118,592 * | 10/1978 | Schieber | 373/88 |
| 4,683,367 * | 7/1987 | Drouet | 219/121.59 |
| 4,710,607 * | 12/1987 | Wilhelmi et al. | 219/121.36 |
| 4,745,338 * | 5/1988 | Hollis, Jr. et al. | 315/111.71 |
| 4,864,096 * | 9/1989 | Wolf et al. | 219/121.36 |
| 5,177,338 * | 1/1993 | Sakuragi | 219/121.52 |
| 5,399,829 * | 3/1995 | Ogilvie | 219/121.38 |

FOREIGN PATENT DOCUMENTS

| | | |
|---|---|---|
| 1219658 | 5/1968 | (GB) . |
| 890567 | 12/1981 | (SU) . |

* cited by examiner

*Primary Examiner*—Mark Paschall
*Assistant Examiner*—Quang Van
(74) *Attorney, Agent, or Firm*—Browdy and Neimark

(57) ABSTRACT

A main electrode (2, 20, 30, 44, 127) for plasma arc generator, a generator (50, 70, 80, 126) comprising same and a process for treatment of solidifying liquid metal by the mentioned generator, wherein the main electrode in association with a counter electrode (15, 28, 42, 54, 73, 86, 122) provides a two-rail structure capable of generating a plasma arc discharge displaceable along a closed path uninterruptedly. The uninterrupted movement of the arc discharge is achieved by a specific design of the main electrode. The electrode comprises an essentially tubular body having a first rim (3, 24, 33, 89) usually connected to a d.c. power source via at least one connector site (12), and a second, working rim (4, 27, 34, 46, 63, 78, 90) serving for the electric arc discharge. The tubular body is divided by at least one slot (gap) (6, 22, 32, 49, 52, 88) associated with one connector site and extending between the first and second rims so that it forms at the second rim region a second rim gap. Two sides of the second rim gap are an arc transmitting (16, 36) and an arc receiving (17, 35) zones, respectively. Mutual positions of these two zones and the associated connector site are such, that when the arc column is created and displaces along the second rim, it will always be transmitted from the transmitting zone to the receiving zone at a location positioned downstream from the projection of the associated connector site to the second rim (in respect of the direction of the plasma arc movement). Owing to this arrangement the arc column will cross the second rim gaps uninterruptedly.

24 Claims, 9 Drawing Sheets

ELECTRODE FOR PLASMA GENERATOR THE GENERATOR COMPRISING SAME AND PROCESS FOR TREATMENT OF SOLIDIFYING LIQUID METAL

FIELD OF THE INVENTION

The present invention relates to plasma arc generators of both the transferable and non-transferable types, and more specifically to plasma apparatus of the kind generating a plasma arc that circulates in a closed path. The invention further relates to an electrode for use in plasma generators of the kind specified.

Plasma arc generators are used for the heat treatment of various objects in numerous technological processes, for example in metallurgical processes for so-called plasma remelting, plasma casting, plasma cleaning, etc. By one of its aspects, the invention relates to a process for heating with a circulating plasma arc a liquid metal chilling and crystallizing within a mold, with the object of eliminating typical casting defects, such as the formation of blowholes and porosity, segregation, formation of contraction cavities, inhomogeneity of chemical composition and crystal structure across the ingot, etc.

BACKGROUND OF THE INVENTION

Plasma generators including plasma arc torches are known in the art, and general descriptions of their design and of their use for various metallurgical applications, can be found in numerous technical monographs or handbooks, e.g. the chapter "Plasma Melting and Casting" in Metals Handbook, Ninth Edition, Vol. 15, Metals Park, Ohio, and the monograph "Plasma Metallurgy, The Principles" by V. Dembovsky, Elsevier, 1985, p.314–315.

Basically, plasma generators can be divided into two groups: those in which both cathode and anode form part of the apparatus which are known as plasma generators with non-transferable arcs or non-transferable plasma arc generators; and those which include only one electrode while the counter electrode is an electricity conducting substrate, which are known as plasma generators with transferable arcs or transferable plasma arc generators.

GB 1268843 describes a non-transferable plasma arc generator comprising a water cooled cathode and two annular anodes, one for ignition and the other for regular operation, connected to a power supply. The cathode tip is protected by injection of an inert gas such as argon, helium or nitrogen.

U.S. Pat. No. 4,958,057 describes a typical transferable plasma arc generator for use to heat metal in a continuous casting process. It comprises a cylindrical cathode-holding member with water cooling arrangements, an ignition anode and a ring-shaped cathode, having an inner channel for the injection of an inert protecting gas. An electric discharge is effected between the cathode and substrate to be treated, which is set as the anode.

It is an intrinsic disadvantage of the conventional plasma generators of both the non-transferable and transferable types, that for proper functioning the injection of a protecting gas or water cooling are required. Where gas cooling is employed, so-called plasma torches are used which comprise a plasma delivery nozzle. Injection of a pressurized inert gas into the torch is associated with the formation of an elongated plasma jet ejected at high velocity from the plasma delivery nozzle which in case of treatment of a solidifying cast metal causes the exertion of localized pressure on the surface of the still solidifying metal, leading to the formation of large cavities during chilling.

The presence of cooling water is dangerous because any leaking water that reaches the hot liquid metal may cause an explosion.

There are also known plasma generators in which a plasma arc is controllably displaced with respect to a treated substrate in an open, e.g. straight, or closed, e.g. circular fashion along a correspondingly shaped electrode. Such displacement of the arc avoids overheating, provides for a more uniform treatment of the substrate and reduces erosion of the electrodes, thereby prolonging the life span of the apparatus. Thus U.S. Pat. No. 5,132,511 discloses a non-transferable plasma torch having two coaxial tubular electrodes axially spaced from each other and provided with an electromagnetic coil for rotating the arc. The coil is mounted in a sealed cylindrical chamber positioned between the two electrodes.

U.S. Pat. No. 5,393,954 describes a non-transferable plasma torch which comprises two coaxial tubular electrodes at least one of which is surrounded by a magnetic field associated with electronic control means, whereby the plasma arc foot is displaced in a controlled fashion. When a plasma-generating gas is injected into a chamber separating said electrodes, an arc is ignited.

It is known that the arc in a plasma generator may be displaced by the action of a ponderomotive force known as the Lorentz force. A Lorentz force arises when an electric charge moves in a magnetic field and is proportional to the magnetic induction of the field, the electric charge, its velocity and also depends on the angle between the vectors of magnetic induction and velocity of the moving charge. It is known that a Lorentz force is created in a plasma generator as a result of interaction between the arc (being an intensive electric discharge), its magnetic field, and the magnetic field created in the generator by the electric current flowing through the electrodes. When the electrodes form a so-called two-rail structure the Lorentz force accelerates and displaces the electric arc.

The term "two-rail structure" used herein with reference to the electrodes in plasma generators should be understood as meaning two parallel current conducting objects (so-called rails) spaced from one another, and connected each to one of the electric power supply poles. When an electric arc is initiated between the electrodes, it moves along the rails away from the site of electric contact thereof with the power supply.

In accordance with prior art terminology plasma arc generators in which the arc discharge is accelerated by a ponderomotive force within a space between two parallel electrodes are sometimes referred to as electromagnetic rail accelerators or plasma accelerators with rail geometry.

The phenomenon, by which the Lorentz force accelerates and displaces the plasma arc in a plasma arc generator with a two-rail structure, is known as the principle of electromagnetic acceleration. It is mentioned in the literature with reference to plasma accelerators or magnetic hydrodynamic generators, e.g. in "*Impulse Plasma Accelerators*" by Alexandrov et al., Charkov, 1983, pp. 192, 194 and in "*Electroslag Welding and Melting*" by J. Kompan and E. Sherbinin, Machinostroenie, 1989, pp. 191, 192. A specific application of the Lorentz force is described in "*Scaling Laws for Plasma Armatures in Railguns*" by Lindsey D. Tornhill and Others, *Transactions of Plasma Science*, Vol. 21, No. 3, June 1993, 289–290.

An example of a non-transferable plasma arc generator with magnetic rail acceleration is described in SU 890567.

In that generator, the electrodes are in form of two coaxial elliptical tubes and the space between the electrodes holds a dielectric material. A wall of each of the tubes is axially slotted such that the slot in one tube faces a non-slotted wall portion of the other tube. Adjacent to each slot there is one electric contact and in this way a two-rail structure is achieved. For uninterrupted circulation of the plasma arc it must be capable of crossing the slots and to this end the width of each slot must be less than the thickness of the arc. However, when crossing any of the slots the arc arrives exactly at the zone of the adjacent electric contact, where direction of its further movement is indefinite, and consequently the speed at which the arc moves near the slots is reduced and the discharge is occasionally even interrupted, which is an obvious disadvantage.

SU 847533 describes a transferable plasma arc generator for treating an electrically conductive substrate. It comprises a main electrode forming part of the generator and the electrically conductive substrate is set as the counter electrode. The main electrode is in form of a spirally wound hollow longitudinal body having one winding whose partially overlapping ends are angularly displaced relative each other to form a gap between them. The rim of one end of the spiral body is placed in proximity of the substrate (proximal rim) and is connected to a pole of an electric power supply by connector means being situated near said gap. The spiral configuration of the electrode complies with the following equation:

$$Y=K(X)^{3/2}$$

where Y is the spiral pitch, K is a coefficient of proportionality and X is the linear distance along the spiral's circumference between the connector means and the spiral's end. Compliance with that equation allegedly ensures acceleration of the arc along the spiral electrode.

However, use of an electrode whose configuration meets the stipulations of the above relationship is associated with a number of shortcomings:

(a) manufacture of the spiral electrode from graphite or tungsten or some other material conventionally used for making electrodes for plasma arc generators, is difficult and expensive;

(b) due to the exponential increase of Y as a function of X, the plasma current fluctuates and consequently, in practice, a plasma arc generator according to SU 847533 is capable of operating reliably without auxiliary means only up to a spiral diameter of not more than 6 cm., while at larger diameters interruptions of the plasma arc might occur. To preempt such interruptions, the plasma arc discharge must be re-ignited at every cycle by means of a high-voltage oscillator;

(c) since the plasma is accelerated non-uniformly along the spiral proximal electrode rim, the electrode is heated in a non-uniform fashion which requires an efficient and reliable water cooling system with appropriate instrumentation for effective water temperature and pressure control. All this renders the plasma generator expensive and renders impossible its applications for missions where use of cooling water is undesirable because of the dangerous consequences of any leakage.

OBJECTS OF THE INVENTION

It is one object of the present invention to provide a simple and inexpensive electrode for a plasma arc generator, adapted to generate a continuously circulating, self-stabilized plasma arc with no need for any water cooling or injection of a protecting gas, and which at least up to an output of about 50 kW may operate for considerable spans of time.

It is another object of the invention to provide a plasma generator including the novel electrode.

It is yet another object of the present invention to provide a transferable arc type plasma generator of the kind specified suitable for heat treatment of solidifying liquid metal in molds.

It is a still further object of the present invention to provide an improved process for heat treatment of solidifying liquid metal in molds with a circulating plasma arc.

GENERAL DESCRIPTION OF THE INVENTION

In the following description and claims the terms "longitudinal" and "longitudinally" are used in relation to a plasma arc generating electrode with a tubular body with two terminal rims, to describe any path or direction along the wall of the tubular body that leads from one rim to the other; and the terms "lateral" and "laterally" signify a direction intersecting a longitudinal line.

By one of its aspects, the invention provides a plasma arc generator electrode which in association with a counter electrode provides a two-rail structure capable of generating a plasma arc discharge displaceable along a closed path in a first direction, which electrode has electric connector means for connection to a d.c. source of electric power supply and comprises an essentially tubular body with a first rim forming part of a first rim region, and a second, working rim forming part of a second rim region and serving for the electric arc discharge, in which electrode:

(i) said electric connector means include at least one connector site on the electrode;

(ii) said tubular body has at least one longitudinally extending gap with a first rim region gap stretch, a main gap stretch and a second rim region gap stretch, each of which gaps divides laterally between two wall sectors each having first and second rim portions, one of said wall sectors carries a connector site associated with the gap;

(iii) the second rim portion of one of said wall sectors has a plasma arc transmitting zone, and the second rim portion of the other wall sector carrying said connector site has a plasma arc receiving zone, which plasma arc transmitting and receiving zones are separated by and border on the second rim region gap stretch of said longitudinally extending gap, thus forming the two sides of said gap stretch;

(iv) said gap-associated connector site is so located that its projection on a second rim portion is laterally removed from said plasma arc-receiving zone in a second direction being opposite to said first direction, whereby in operation a Lorentz force is generated in said two-rail structure causing a plasma arc formed between said plasma arc generator electrode and counter electrode to move uninterruptedly in a closed path in said first direction along said second rim region and across each of said second rim region gap stretches.

The essentially tubular body of a plasma generator electrode according to the invention may be cylindrical, prismatic, polyhedral with a star-shaped profile and the like.

In accordance with one embodiment of the invention, said tubular body has one single gap and said two wall sectors merge into a single body extending from one side of the gap to another. Thus, in accordance with this embodiment the electrode has one single slotted tubular body.

In accordance with another embodiment of the invention, said tubular body has several gaps and several wall sectors, each wall sector extending between two gaps.

The portion of a plasma arc that is in contact with the second rim region of the generator electrode is referred to in the art as "foot". In operation of a plasma arc generator electrode according to the invention the plasma arc foot moves in a closed path along the second rim region.

In accordance with a preferred embodiment of a plasma arc generator electrode according to the invention, each second rim region gap stretch is so dimensioned as to be essentially not wider than the smallest diameter of the actual plasma arc column; and the distance between said projection of the gap-associated connector site on to a second rim portion and said electric arc receiving zone is essentially not smaller than the largest diameter of the foot of the actual plasma arc column.

It is noted that the diameter of the arc column and the diameter of the arc foot are visibly determinable values, which may be measured experimentally. Values of the smallest and largest arc column diameters may moreover be calculated from values of the largest and the smallest arc currents, with the aid of equations known to persons skilled in the art. For example, in a gaseous environment at atmospheric pressure, and at an arc current of about 300 A the arc column diameter on a solid electrode will reach about 5 cm, and the diameter of the arc foot is usually within the range of from 3 to 5 mm.

The meaning of the above provisions is that the narrowest possible arc column initiated in the device should be able to cross a gap, and the widest foot of the arc should not overlap a zone underlying a connector site while crossing a second rim region gap stretch, but rather move through the electric arc receiving zone that is laterally removed from the connector site in the manner specified, whereby uninterrupted movement of the electric arc is ensured.

Preferably the connector sites are placed in proximity to the first rim region.

If desired, the second rim region of the electrode may be bevelled whereby the surface for the electric discharge is increased and deviates from normal to the axis of the tubular body, thereby enabling to control orientation of the arc.

In accordance with one embodiment of a plasma arc generator electrode according to the invention the main stretch of said at least one longitudinally extending gap is so shaped that the projection of said gap-associated connector site on a second rim portion is located in that wall sector that holds the electric arc transmitting zone.

According to one embodiment of the invention, the sectors of said tubular body are so designed that the projection of each gap-associated connector site on a second rim portion is located off said closed path, either within or outside the perimeter of said closed path.

If desired, the wall sectors of the plasma arc generator electrode according to the invention may be so designed that at least the second rim region stretch of each gap is formed by an overlap between adjacent wall sector portions comprising said plasma arc transferring and receiving zones. In such a configuration, the cross-sectional area of the electrode is increased beyond a cylindrical tubular body whose perimeter is defined by the connector sites on the first rim. For example, the tubular body of the electrode may have a star-like polyhedral shape and be assembled from a plurality of modular body segments partially overlapping near their edges.

When powered, a plasma generator electrode according to the invention, e.g. of graphite or a refractory metal is capable of generating a plasma arc discharge of up to 50 kW power, without the need for water cooling. However, for electrodes according to the invention with a cross-dimension not exceeding 7 cm, operation with interruptions may be required.

According to a second aspect of the invention there is provided a plasma arc generator apparatus comprising an electrode of the kind specified. The plasma arc generator apparatus may be of either the non-transferable or transferable type. A non-transferable plasma arc generator apparatus according to the invention may be utilized for the plasma treatment of non-conductive substrates such as raw materials for the building industry, waste or any other dielectric material.

By one embodiment, the invention provides a transferable plasma arc generator apparatus comprising a plasma arc generator electrode for cooperation with an electricity conducting substrate serving as a counter electrode, which plasma arc generator electrode and counter electrode form together a two-rail structure capable of generating a plasma arc discharge displaceable along a closed path in a first direction, which plasma arc generator electrode has electric connector means for connection to a d.c. source of electric power supply and comprises an essentially tubular body with a first rim forming part of a first rim region, and a second, working rim forming part of a second rim region and serving for the electric arc discharge, in which electrode:

(i) said electric connector means include at least one connector site on the electrode;

(ii) said tubular body has at least one longitudinally extending gap with a first rim region gap stretch, a main gap stretch and a second rim region gap stretch, each of which gaps divides laterally between two wall sectors each having first and second rim portions, one of said wall sectors carries a connector site associated with the gap;

(iii) the second rim portion of one of said wall sectors has a plasma arc transmitting zone, and the second rim portion of the other wall sector carrying said connector site has a plasma arc receiving zone, which plasma arc transmitting and receiving zones are separated by and border on the second rim region gap stretch of said longitudinally extending gap, thus forming the two sides of said gap stretch;

(iv) said gap-associated connector site is so located that its projection on a second rim portion is laterally removed from said plasma arc-receiving zone in a second direction being opposite to said first direction, whereby in operation a Lorentz force is generated in said two-rail structure causing a plasma arc formed between said plasma arc generator electrode and counter electrode to move uninterruptedly in a closed path in said first direction along said second rim region and across each of said second rim region gap stretches.

In the following description a plasma arc generator electrode according to the invention forming part of a plasma arc generator apparatus will be referred to occasionally as "main electrode".

In one embodiment, the transferable plasma arc generator apparatus according to the invention comprises a cylindrical housing surrounding the main electrode and spaced therefrom so as to form with it an annular chamber. If desired, a lid may be provided for sealing the housing from the end proximal to the electrode's first rim. Further if desired, ignition means for igniting a plasma arc discharge may be mounted within the annular space between the housing and the main electrode in proximity of the first rim, whereby upon ignition an auxiliary arc is generated which initiates the main arc.

Typically the ignition means may comprise a first stem-like electrode held within a second, coaxial tubular electrode in a spaced relationship, which first and second electrodes are connectable to the two poles of the d.c. electric power supply, a third, rod-shaped electrode being mounted substantially normal to said second tubular electrode at an end portion thereof, which third electrode is electrically connectable to a high voltage oscillator. Preferably, said end portion of the tube is formed with an inner ledge so as to define a narrowed gap between the stem-shaped and tubular electrodes in the region where the high oscillation voltage is applied via the third, rod-shaped electrode.

By one particular design, the ignition means is secured to the lid of the housing and extends axially to the region of the second rim of the main electrode.

According to a preferred embodiment of the transferable plasma arc generator apparatus according to the invention, means are provided for axial displacement of the main electrode whereby the distance of the second rim from the substrate may be adjusted and optimized in the course of operation.

A typical application of a transferable plasma arc generator apparatus according to the invention is the heat treatment of a liquid metal during solidification in a suitable mold such as an ingot mold.

Accordingly, by yet another aspect the invention provides a process of heat treatment of a solidifying liquid metal inside a mold, comprising providing a transferable plasma arc generator apparatus having a main electrode for cooperation with an electricity conducting substrate serving as a counter electrode, which main electrode in association with said electricity conducting substrate provides a two-rail structure capable of generating a plasma arc discharge displaceable along a closed path in a first direction, which main electrode has electric connector means for connection to a d.c. source of electric power supply and comprises an essentially tubular body with a first rim forming part of a first rim region, and a second, working rim forming part of a second rim region and serving for the electric arc discharge, in which electrode:

(i) said electric connector means include at least one connector site on the electrode;

(ii) said tubular body has at least one longitudinally extending gap with a first rim region gap stretch, a main gap stretch and a second rim region gap stretch, each of which gaps divides laterally between two wall sectors each having first and second rim portions, one of said wall sectors carries a connector site associated with the gap;

(iii) the second rim portion of one of said wall sectors has a plasma arc transmitting zone, and the second rim portion of the other wall sector carrying said connector site has a plasma arc receiving zone, which plasma arc transmitting and receiving zones are separated by and border on the second rim region gap stretch of said longitudinally extending gap, thus forming the two sides of said gap stretch;

(iv) said gap-associated connector site is so located that its projection on a second rim portion is laterally removed from said plasma arc-receiving zone in a second direction being opposite to said first direction, installing said plasma generator so that said second rim is proximal to the surface of the liquid metal at a suitably selected distance therefrom, connecting said main electrode to one pole of an electric power supply and the liquid metal to the other pole thereof, igniting an electric arc, whereby in operation a Lorentz force is generated in a two-rail structure comprising said main electrode and said counter electrode, causing a plasma arc formed between said main electrode and counter electrode to move uninterruptedly in a closed path in said first direction along said second rim region and across each of said second rim region gap stretches;

and continuing the treatment until the liquid metal reaches solidification.

The control of the chilling and solidifying regime of a liquid metal by heat treatment with a plasma arc in accordance with the invention, improves the quality of the solidified metal. In accordance with the invention it was found that such improvement is due to the displacement of the plasma arc along a closed path by action of a Lorentz force generated inside the novel plasma generator. It has further been found in accordance with the present invention that due to such treatment, prior art casting defects such as formation of blowholes and porosity, segregation, formation of contraction cavities and inhomogeneity of chemical composition and crystal structure across the ingot, are avoided. It has also been found that in accordance with the invention the amount of waste metal is reduced. Still further it has been found that, as a consequence of the heat treatment according to the invention the crystalline structure of the solidified metal is improved, possibly in consequence of the electromagnetic fields which account for the creation of the Lorentz force.

BRIEF DESCRIPTION OF THE DRAWINGS

For better understanding, some specific embodiments of the invention will now be described, by way of example only, with reference to the annexed drawings in which.

DETAILED DESCRIPTION OF SPECIFIC EMBODIMENTS

Figure 1:
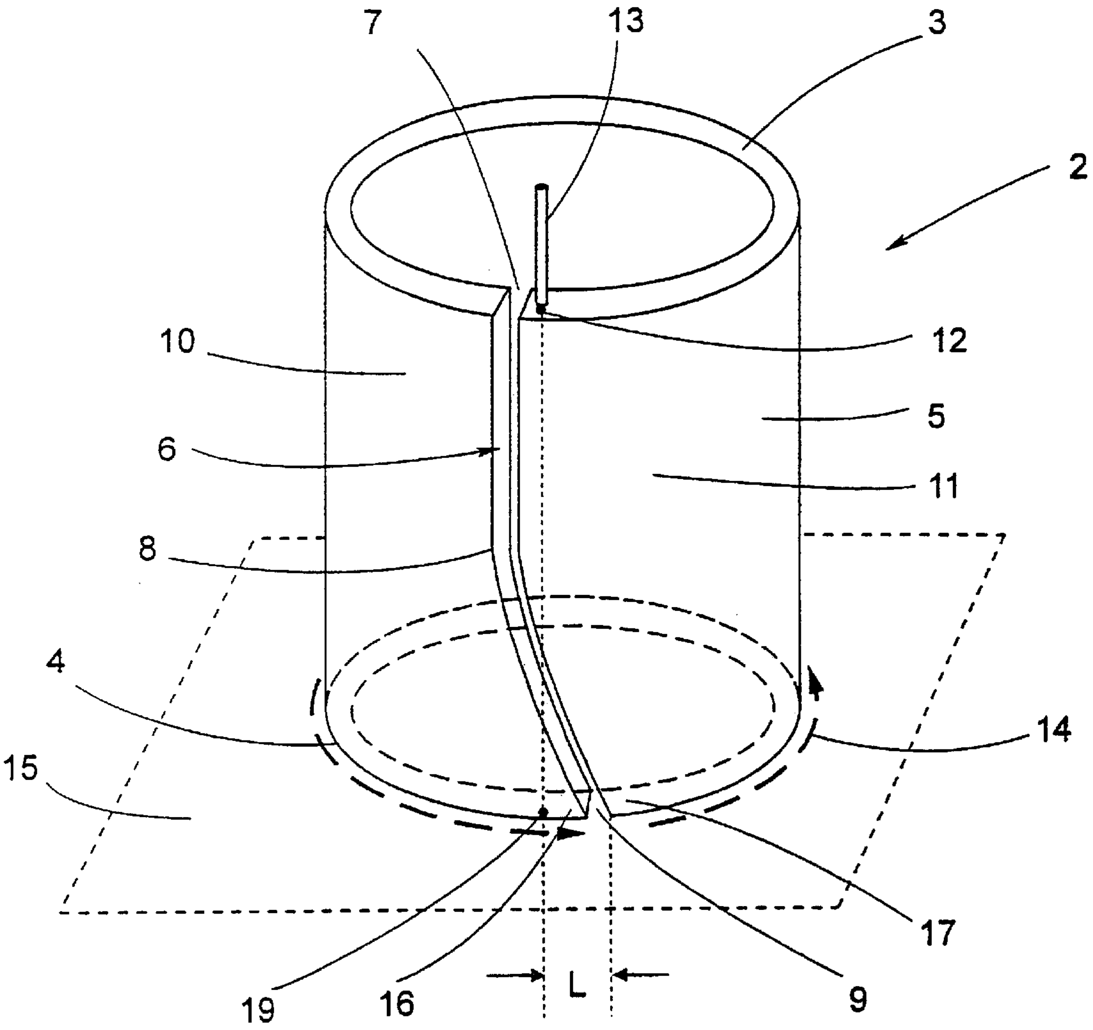
FIG. 1 is a schematic three-dimensional view of one embodiment of a plasma arc generator electrode according to the invention.

FIG. 1 illustrates a perspective view of one embodiment of a plasma arc generating electrode according to the invention. As shown, electrode 2 comprises a tubular cylindrical body having a longitudinal axis, a first rim 3, a second, working rim 4 serving for the electric arc discharge and being a constituent of a two-rail structure which in operation defines a closed path for the movement of the electric arc in consequence of a Lorentz force generated in the device. Side wall 5 of the cylindrical electrode body is sliced by a single throughgoing gap 6 generally extending in the axial direction and having a first rim region gap stretch 7, a main gap stretch 8 and a second rim region gap stretch 9. As shown, the main gap stretch 8 comprises two parts forming between them an obtuse angle. Gap 6 divides between two sectors 10 and 11 of wall 5. Electrode 2 has on the first rim 3 a gap-associated connector site 12 fitted with a connector 13 serving for connection to a pole of a d.c. power source (not shown). It is noted, however, that the connector site need not necessarily be located on the first rim and may be positioned at any level of the tubular body, but preferably at a reasonable distance from the working rim 4 so as not to be affected by the plasma arc and substrate fumes. The dashed arrow 14 in FIG. 1 shows the direction of movement of the generated electric arc in operation in consequence of the Lorentz force, i.e. the so-called first direction. As mentioned, for the purpose of this movement, the electrode 2 with the second rim 4 is one component of the required two-rail structure and the counter electrode 15 constitutes the other component.

The second rim region gap stretch 9 divides between an electric arc transmitting zone 16 and an electric arc receiving zone 17. The receiving zone 17 is on the same wall sector 11 as the connector site 12.

As is seen, in this embodiment, gap 6 is so shaped that projection 19 of the connector site 12 on the second rim 4 of the electrode 2 is located close to the electric arc transmitting zone 16 and is removed from the arc receiving zone 17 in a direction (the so-called second direction) that is opposite to the mentioned first direction by a distance L. This distance is essentially not smaller than the largest diameter of the foot of the generated plasma arc column.

When the arc is initiated between the electrode 2 and the counter electrode 15, it forms a current conducting plasma body bridging the two electrodes. As the two electrodes constitute a two-rail structure, the electric current creates a magnetic field which interacts with the current of the arc and its magnetic field, thus causing the generation of the Lorentz force which drives the arc column along the second rim 4 in the direction away from the projection 19 of the connector site 12, i.e. in the direction indicated by the dashed arrow 14.

According to the invention, the uninterrupted movement of the plasma arc is achieved due to the fact that on each crossing of the second rim gap stretch 9 the plasma arc foot is downstream (with reference to the movement of the arc in the direction of arrow 14) a zone of electrical influence of the connector site 12, i.e. downstream of projection 19.

Figure 2A:
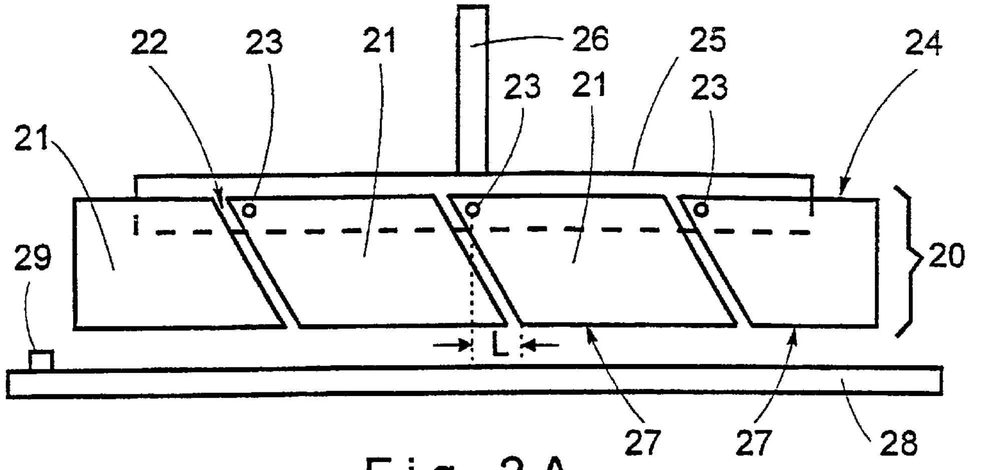
FIG. 2A is a side view of another embodiment of an electrode according to the invention, also showing schematically a counter-electrode.
Figure 2B:
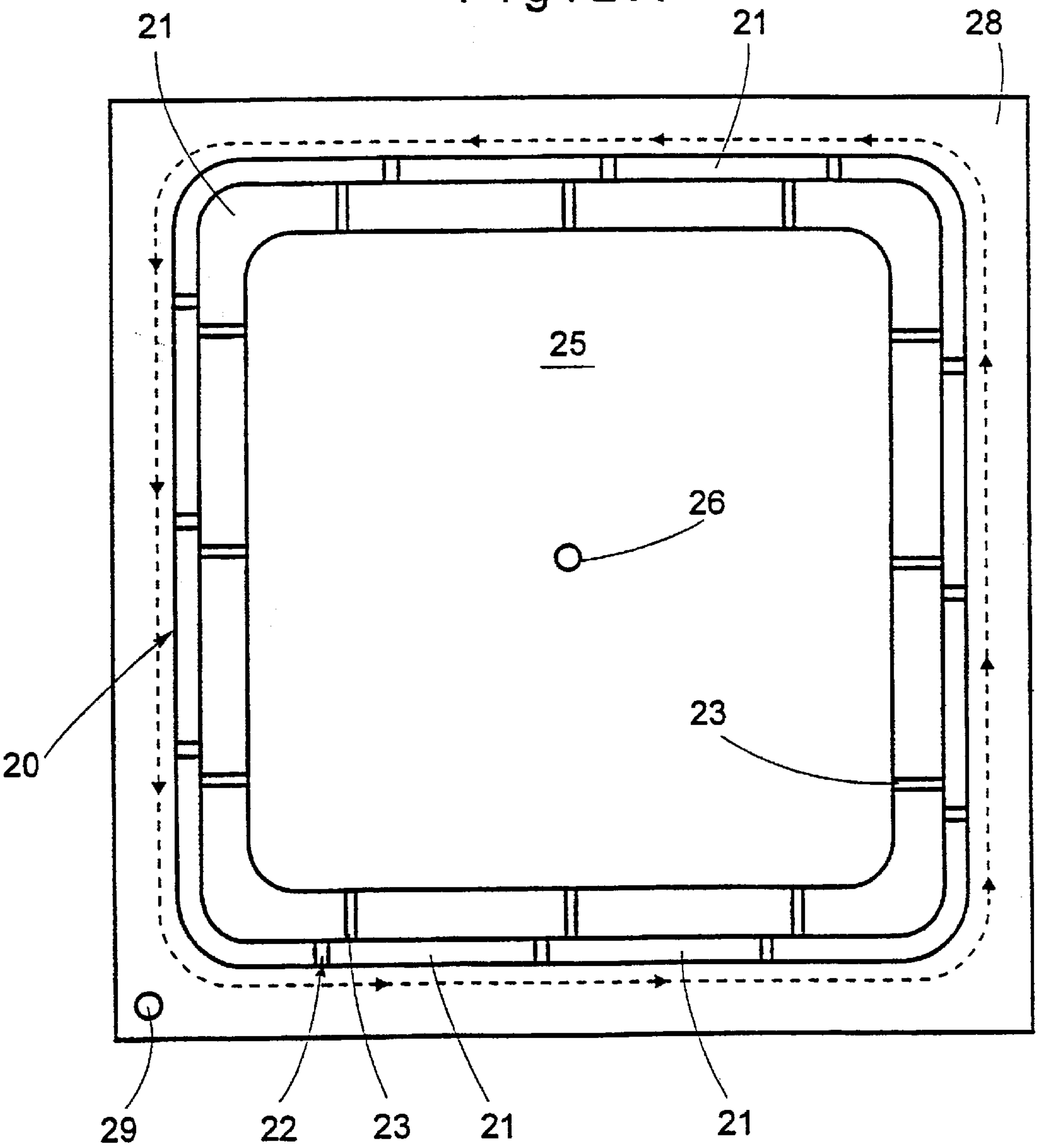
FIG. 2B is a top view of the embodiment shown in FIG. 2A.

FIGS. 2A and 2B illustrate another embodiment of an electrode according to the invention, comprising a rectangular tubular body 20 assembled from a number of segments forming the electrode wall sectors 21 and separated by a plurality of slanted gaps 22. The upper edges of the segments 21 form a first rim 24 of the electrode 20, and the lower edges thereof form a second rim 27 thereof, each of sectors 21 thus having first and second rim portions. Each of the electrode sectors 21 is provided with an electric connector site fitted with laterally projecting connectors 23 and positioned at the upper inner portion of the sectors 21 close to the first rim thereof. All connectors 23 are interconnected by a common current carrying plate 25 electrically connectable to a pole of a d.c. power source (not shown) via a current carrying bus 26. Essentially the location of each gap-associated connector 23 relative to the associated gap 22 and of the electric arc transmitting and receiving zones on the two sides of the second rim region gap stretch, as well as the location of the projection of each connector site on a second rim portion are all similar to the arrangement shown in FIG. 1, though the shapes and numbers of the sectors and gaps are different. As can be seen, the projection of each connector 23 associated with a particular electrode body sector 21, to a plane holding the second rim 27 of the electrode 20 falls on to the adjacent electrode segment, close to its plasma arc transferring zone. In FIGS. 2A and 2B there is schematically shown a counter electrode 28 positioned under the second rim 27 of the electrode 20. The counter electrode is provided with a terminal 29 for connection to the opposite pole of the d.c. power source (not shown). When an electric arc discharge is initiated between electrodes 20 and 28, a Lorentz force is generated by which the plasma arc is displaced uninterruptedly along the second working rim 27 of the tubular body in the direction of a dotted arrow in FIG. 2B (first direction).

Figure 3:
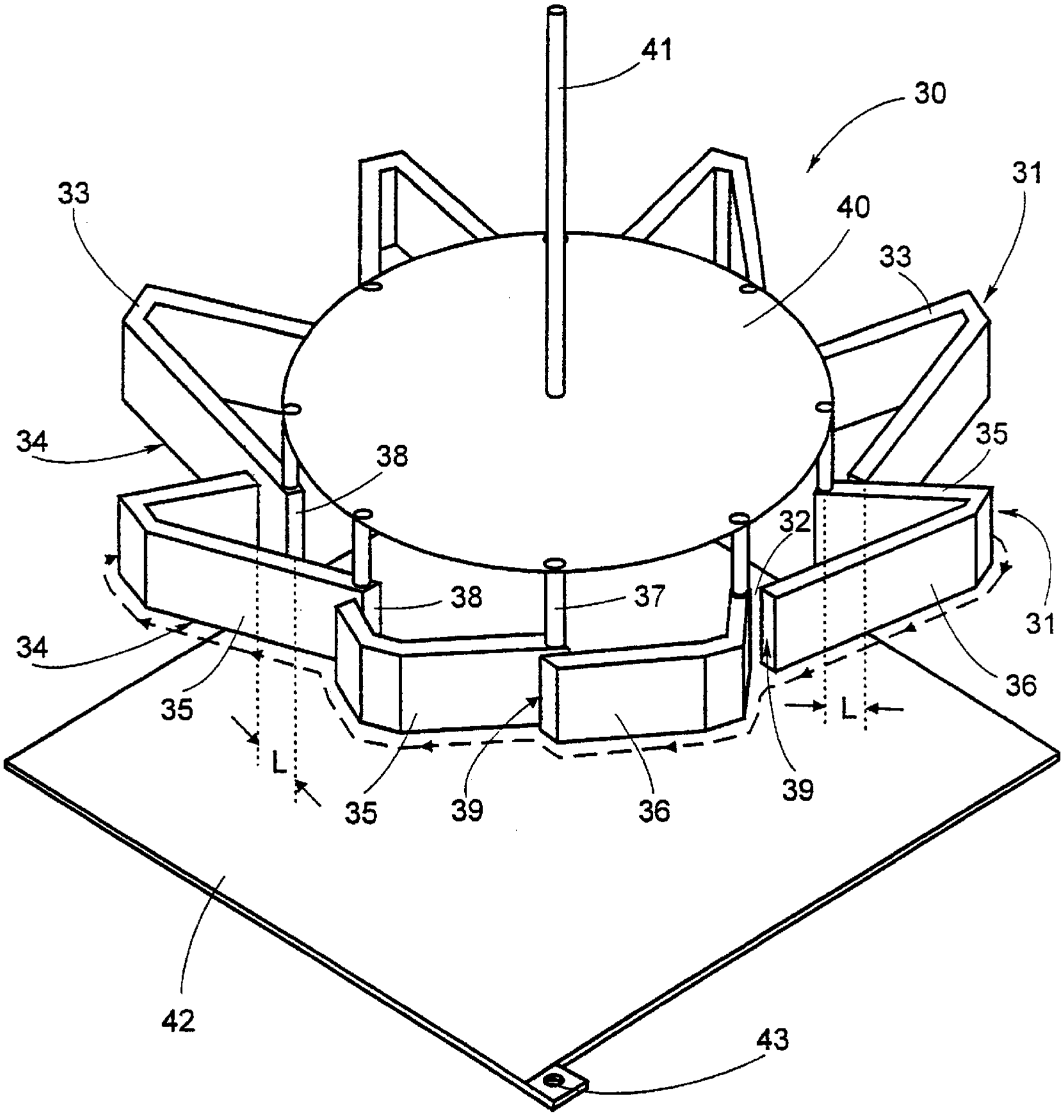
FIG. 3 is a schematic three-dimensional view of yet another embodiment of a plasma arc generator electrode according to the invention, together with a counter-electrode.

FIG. 3 illustrates yet another embodiment of an electrode 30 according to the invention, having a star-like shape and comprising an essentially tubular body assembled from a plurality of frusto-triangular segments forming a plurality of wall sectors 31 separated by axially extending gaps 32. In the axial direction the tubular body of the electrode 30 extends between a first (upper) rim 33 and a second (lower), working rim 34. The frusto-triangular wall sectors 31 have each a first wall portion 35 which holds the plasma arc receiving zone and also an electric connector 37, and a second wall portion 36 which holds the plasma arc transmitting zone. The edge 38 of a first portion 35 of a sector 31 that is close to an associated gap 32 is referred to herein as a proximal edge, and the opposite edge 39 of a second portion 36 of an adjacent sector 31 is referred to herein as distal edge 39. The electric connector means 37 of all the electrode sectors 31 are connected to a common current carrying plate 40 provided with a bus 41 for connecting to a pole of a d.c. power source (not shown). Underneath the electrode 30 there is shown schematically a counter electrode 42 with a terminal 43 for connection to the opposite pole of the d.c. power source (not shown).

It can be seen that the electrode sectors 31 are arranged in such a manner, that projections of the connectors 37 on the second rim 34 are situated within the perimeter of the closed path of the arc movement in said first direction, shown by way of the dashed arrow. Moreover, each first portion 35 of a sector 31 partially overlaps the second wall portion 36 of an adjacent electrode sector 31 with the formation of said gaps 32. Thus, each proximal edge 38 with the associated connector 37 is removed from the adjacent distal edge 39 in a second direction being opposite to said first direction, by a distance L. In this specific embodiment this clearance is also the distance between the electric arc receiving zone and the projection of the site of the electric connector means 37 on the second rim 34. (As defined, the arc transmitting zone and the arc receiving zone form sides of each of the gaps 32 at the second rim's 34 region.) Owing to that arrangement, each electric arc transmitting zone (not seen) transmits the moving arc column to the adjacent arc receiving zone across the second rim region gap stretch at a location which is downstream from the site of the connector 37, thus ensuring the uninterrupted movement of the arc in the said first direction of the dashed arrow.

Figure 4:
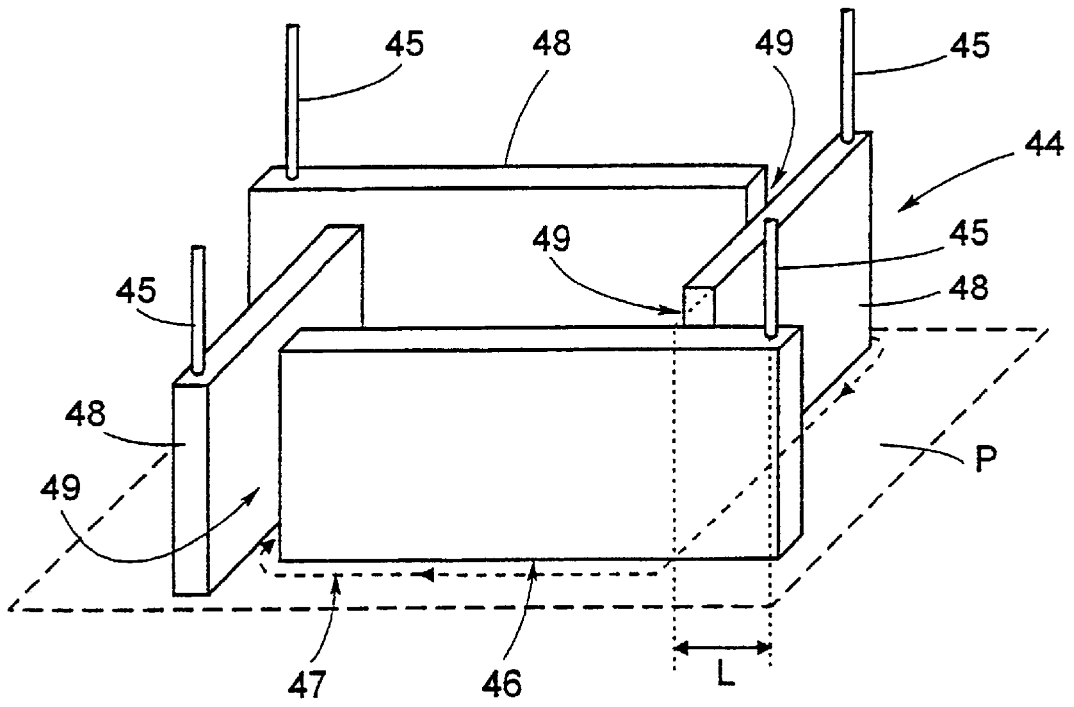
FIG. 4 is a schematic three-dimensional view of yet another embodiment of a plasma arc generator electrode according to the invention.

FIG. 4 shows schematically yet another embodiment 44 of an electrode according to the invention. Similar as in the embodiment of FIG. 3, in that the gaps are axial with their first rim region gap stretch, main gap stretch and second rim region gap stretch being aligned, and also in that the projections of the connector means 45 on to a plane P holding the second working rim 46 of the electrode 44, are off the closed path 47 of the plasma arc movement on the same plane P. However, as distinct from the embodiment of FIG. 3, the projections of the connector means 45 fall outside the perimeter of the path 47, and the wall sectors 48 do not overlap one another near gaps 49. Similarly as in FIG. 3, each projection of a connector 45 on plane P holding the second rim 46 is removed from an associated plasma arc transmitting zone in a direction opposite to that of the movement of the plasma arc, by a distance L whereby in operation uninterrupted movement of the plasma arc along its closed path is ensured.

All the electrode embodiments illustrated in FIGS. 1 to 4 are designed for providing an uninterrupted circulating plasma arc discharge in plasma generators. As mentioned, the width of the second rim region gap stretch should preferably be not greater than the diameter of the narrowest arc column designed to be initiated on the electrode, and the distance L should preferably be not smaller than the widest foot of an arc generated on the electrode. The inventive configuration of the electrode allows to use it for relatively large electrodes without any water cooling and injection of a protecting gas for stabilizing the plasma discharge, and at least up to power output of about 50 kW.

Figure 5:
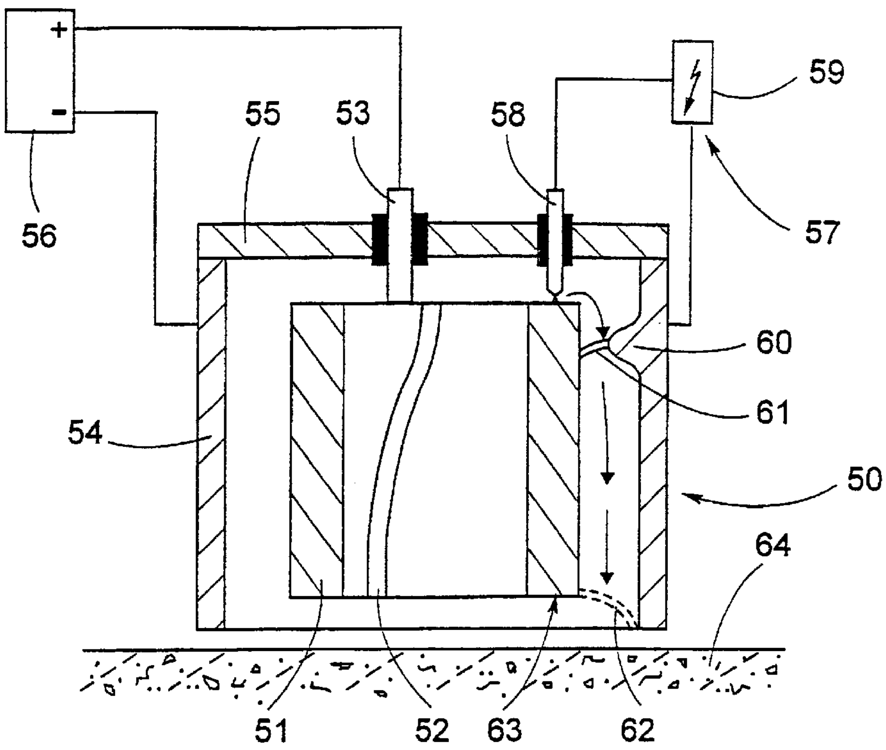
FIG. 5 is a schematic cross-sectional view of one embodiment of a non-transferable plasma arc generator apparatus according to the invention.
Figure 6:
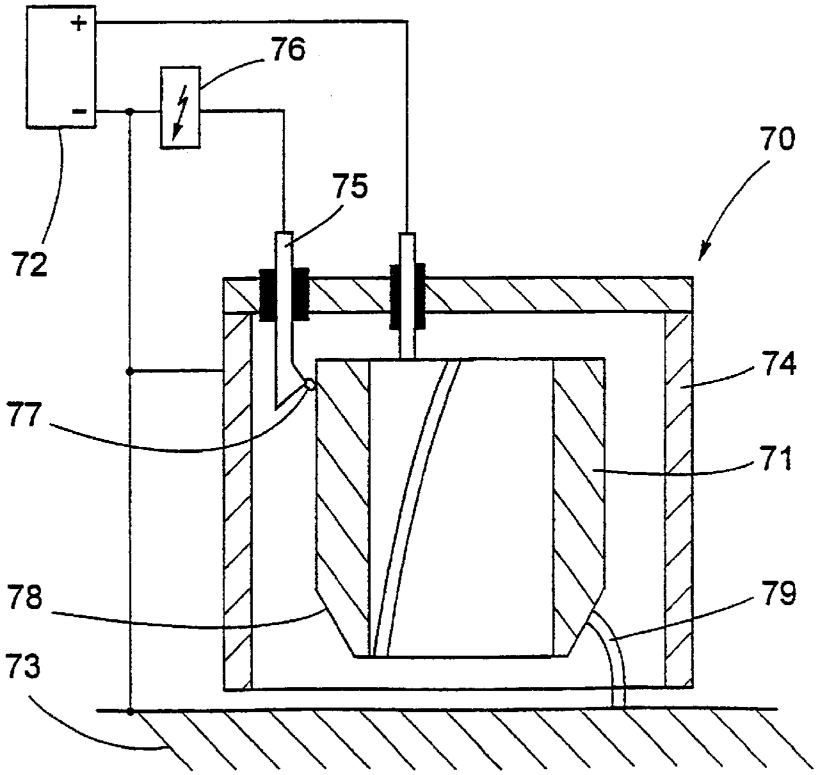
FIG. 6 is a schematic cross-sectional view of one embodiment of a transferable plasma arc generator apparatus according to the invention.

FIGS. 5 and 6 illustrate schematically and by way of example only, embodiments of plasma generator apparatus according to the invention of, respectively the non-transferable and transferable types.

Referring first to FIG. 5, there is shown in an axial cross-sectional view one embodiment of a plasma generator apparatus 50 comprising a main tubular electrode 51 according to the invention having a slanting throughgoing gap 52 and being provided with electric connector means 53. The main electrode 51 is concentrically surrounded by a conductive cylindrical housing 54 having a lid 55. It is noted that lid 55 is optional. The main electrode 51 and the housing 54 are connected to two opposite poles of a high current d.c. power source 56, as known per se, with the housing 54 serving as the counter electrode in the apparatus. The apparatus 50 is also provided with ignition means 57 for initiating an auxiliary arc discharge. The ignition means comprise an ignition electrode 58 energized from a high voltage oscillator 59 as known per se, and a protrusion 60 provided on the inner wall of the housing and positioned close to the main electrode 51 serves to facilitate ignition of an auxiliary arc 61 which upon ignition moves to the lower rim region of the main electrode. The vertical displacement of the auxiliary arc is also caused by the Lorentz force, which in this particular case appears owing to existence of a current carrying, rail-like structure comprising the main electrode 51 and the housing 54. The main arc discharge 62 is established between the lower rim region of the main electrode 51 and the counter electrode 54, and starts to circulate around the lower rim 63 of the tubular electrode 51, thus providing heat treatment of a substrate 64 (for example, a concrete slab).

FIG. 6 illustrates schematically a cross-sectional view of a transferable plasma arc generator apparatus 70 according to the invention. A main tubular electrode 71 of the apparatus has the above-described configuration and is connected to a positive pole of the d.c. power source 72, the opposite, negative pole being connected to an electrically conductive substrate 73 which is the object to be treated and serves as counter electrode. The negative pole of the power source 72 is also connected to a cylindrical housing 74 concentrically surrounding the main electrode 71. The lower portion of the inner wall of the housing 74 is covered by a high-temperature resistant, electrically insulating layer, for example, painted by a suitable paint (not shown). An ignition electrode 75 is mounted in the annular space formed between the main electrode and the housing. When the ignition electrode 75 is energized by a high voltage oscillator 76, an auxiliary arc 77 is generated between the main electrode and the ignition electrode, and is then transferred downwards to the lower rim region 78 of the main electrode 71. The lower rim 78 region is bevelled in a manner shown in the drawing, thus providing the desired shape and orientation of the main arc discharge 79. The bevelled rim region 78 and the painted wall of the housing 74 cause the arc 79 to span from the rim 78 to the surface 73, rather then to the housing 74.

Figure 7A:
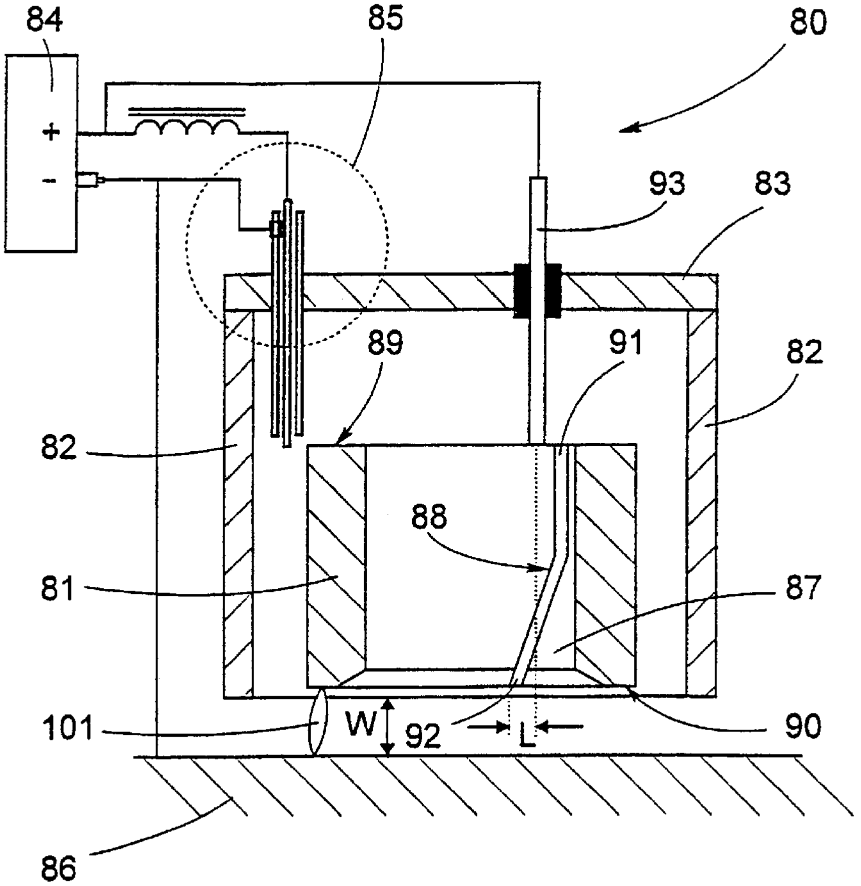
FIG. 7A is a schematic axial cross-sectional view of another embodiment of the transferable plasma arc generator apparatus according to the invention.
Figure 7B:
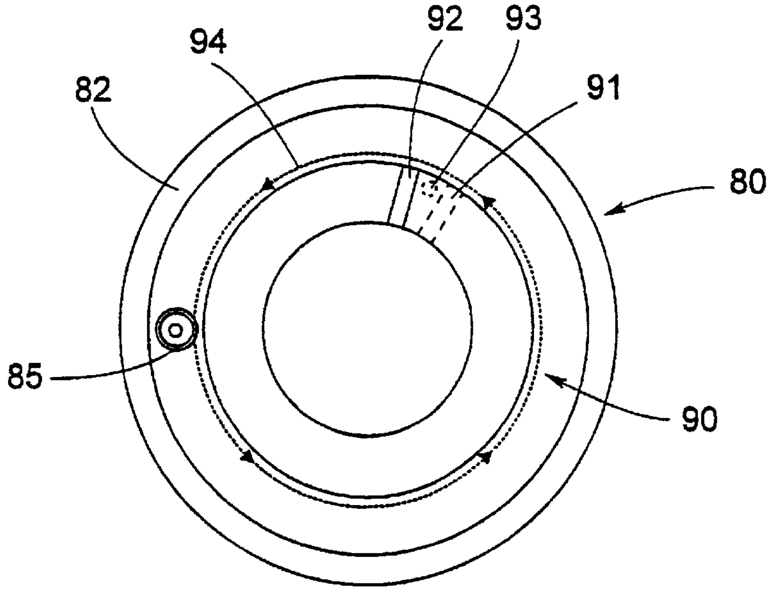
FIG. 7B is a bottom view of the embodiment shown in FIG. 7A.

FIGS. 7A and 7B show schematically an axial cross-sectional view and bottom view, respectively, of yet another embodiment 80 of a transferable plasma generator apparatus according to the invention. The apparatus comprises a main tubular electrode 81 mounted within a cylindrical housing 82 sealed from above by a cover 83, which latter is optional. The generator is connected to a d.c. power supply unit 84 including a high current source and a high voltage oscillator (not shown) serving for energizing the main and counter electrodes and the ignition means 85 of the apparatus. The longitudinal axis of the main electrode 81 is vertical to the surface of an object to be treated, e.g., a metal piece, which is set as a counter electrode 86. The housing 82 that accommodates the main electrode 81, is installed at a distance W from the surface of the metal piece to provide for a working space for a plasma arc discharge. The main electrode 81 according to the invention, may be manufactured from graphite or from electrically conductive, erosion resistant refractory material. The ignition means 85 protrudes from the cover 83 and is situated in the annular space formed between the main electrode 81 and the housing 82. An electrically conductive connector 93 is releasably mounted in the cover 83 and is electrically connected at one end to the power supply unit 84, and at its opposite end to the main electrode 81 so as to supply electrical power thereto.

A gap 88 shown in FIG. 7A extends from the first (top) rim 89 of the cylindrical tubular main electrode 81 down to the second (bottom), working rim 90 thereof, and has a first rim region gap stretch 91, a main gap stretch and a second rim region stretch 92. As further shown in FIG. 7A, the gap 88 comprises two parts, a vertical one which is parallel to the generatrix of the cylindrical side wall of the electrode 81, and a slanting one, which parts include between them an obtuse angle. Due to this design of gap 88, the first and second rim region gap stretches 91 and 92 are not in alignment and are angularly displaced as shown in FIG. 7B.

The electrode 81 comprises one electrode sector fitted with one electric connector 93 mounted in a lid 83 by means of an insulating sleeve and having its site at the first rim 89 of the electrode in close proximity to the first rim region gap stretch 91. The projection of the connector 93 on to the second rim 90 is located between the second rim region gap stretch 92 and the projection of the first rim region gap stretch 91 on to second rim 90, at a distance L from stretch 92 in a direction opposite to that of the movement of the plasma arc shown by the arrows in the circular dashed line 94.

Figure 8:
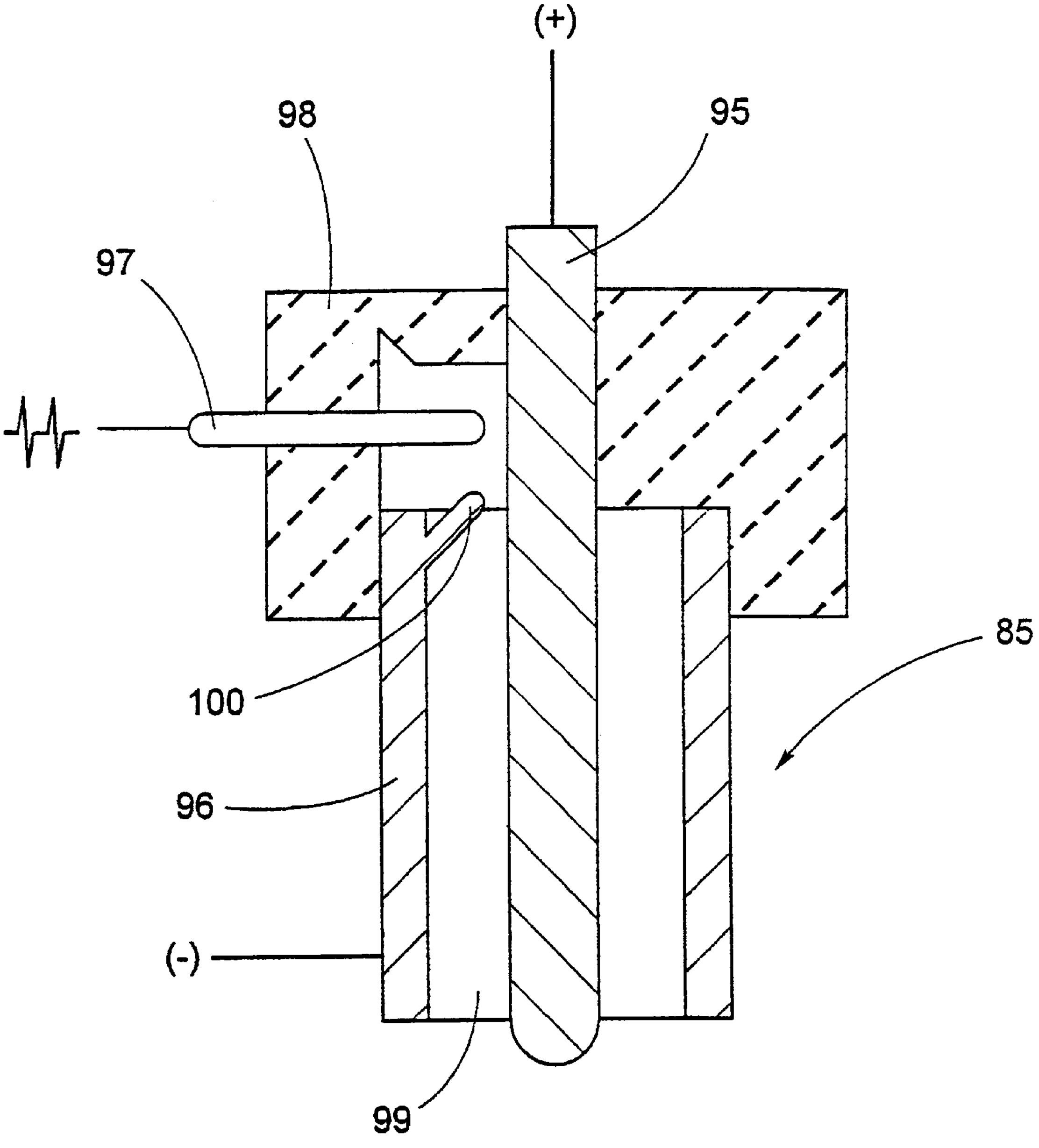
FIG. 8 is an enlarged cross-sectional view of ignition means in a plasma arc generator apparatus according to the invention.

FIG. 8 illustrates one embodiment of the ignition means in a plasma arc generator apparatus according to the invention, e.g. that shown in FIG. 7A under reference number 85. The ignition means 85 may be releasably fitted in the cover 83 of the apparatus of FIGS. 7A and 7B so as to project between the main electrode 81 and the sidewall of the housing 82. However, other locations of the ignition means are conceivable. In the embodiment shown in FIG. 8, the ignition means 85 consists of a first, second and third electrodes 95, 96 and 97 which are electrically connected to the power unit 84 and secured within a high voltage insulating cap 98. The electrode 95 is in form of an elongated stem partially and coaxially accommodated within the second, tubular electrode 96 in a spaced relationship with the formation of an annular space 99. The third electrode is in form of a horizontal rod 97 mounted near the upper edge of the tubular electrode 96 with the inner end close to electrode 95. The electrode 97 is essentially normal to the electrodes 95 and 96 and is electrically connected to the high voltage oscillator (not shown).

It is advantageous if the upper region of the tube 96 is formed with an inner ledge 100 so as to define a dedicated narrow gap between electrodes 95 and 96 in the region where the high oscillation voltage is applied.

Preferably the ignition means 85 are mounted remote from the working space W since in this way functioning thereof is not significantly influenced by the hot and highly erosive atmosphere present in the working space. In practice, it is recommended that the ignition means be formed as a module so as to enable fast and convenient maintenance and replacement thereof.

The plasma arc generator apparatus illustrated in FIGS. 7A, 7B and 8 is put into effect in the following way. The power is switched on and a working voltage of approximately 170 V is applied simultaneously within the working space between the main electrode 81 and the metal surface 86, between the main electrode 81 and housing 82, as well as within the annular space 99 between the electrodes 95 and 96 of the ignition means 85. Thereafter the high voltage oscillator is switched on so as to supply oscillating high voltage sufficient for generating an electrical discharge between electrode 97 and the ledge 100 and also a discharge between the ledge 100 and electrode 95. This arc discharge is followed by the formation of an auxiliary plasma arc within a gap between the coaxially disposed electrode means 95 and 96. The plasma arc is shifted downwards along the side wall of the main electrode 81 by virtue of rail acceleration provided between respective parallel surfaces of the cylindrical housing 82 and the main electrode 81, and is pushed towards the second rim 90 of the main electrode 81 at a speed of about 40 m/sec. The full time required for the ignition step does not exceed 0.002 sec. After the auxiliary plasma arc generated by the ignition discharge has reached the second rim 90, it acquires the shape of the main plasma arc discharge 101 between the second rim 90 of the main electrode and the surface 86 of the metal to be treated, which main plasma arc rotates in the working space W.

Figure 9:
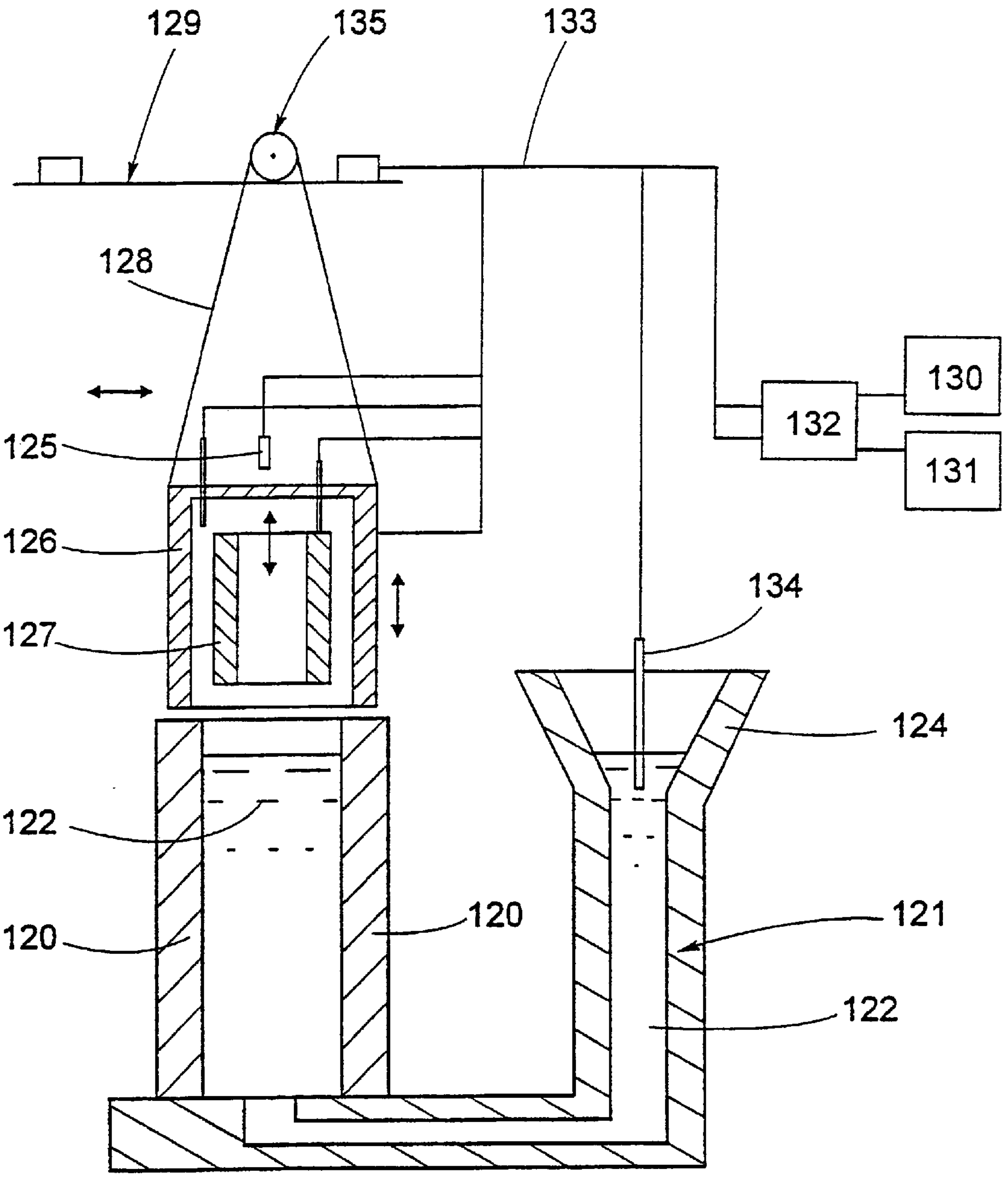
FIG. 9 is a general view of a setup for the implementation of controlled chilling and solidification of liquid metal in a mold, by means of a plasma arc generator apparatus according to the invention.

FIG. 9 shows schematically how a plasma generator according to the present invention, can be used for heat treatment of a liquid metal solidifying within an ingot mold.

The setup shown in FIG. 9 includes an ingot mold 120, which has a bottom pouring arrangement with a pouring gate 121. The liquid metal 122 is poured from a ladle (not shown) into a funnel 124 of the pouring gate system 121, enters the ingot mold 120 through the bottom thereof and fills it up to the height controlled by a sensor 125. Adjacent to the upper part of the mold 120, there is disposed a plasma arc generator apparatus 126 containing a main electrode 127 according to the invention held in a carriage 128 having wheels 135 mounted on rails 129 and thus capable of being reversibly shifted between a rest position out of alignment with mold 120 and an operational position in alignment with the mold. There are further provided means (not shown) capable of lifting and lowering the apparatus 126. The plasma arc generator apparatus 126 comprises a main power source 130, a high voltage oscillator 131 and a control panel 132 for controlling the shifting of the apparatus 126 to and from the working position as well as its functioning during the working cycle. To this end, control panel 132 is equipped with appropriate electronic control means (not shown) enabling operation in a manual mode or in accordance with a preprogrammed schedule.

A bus 133 with appropriate electric cables is provided for electric communication between the power sources 130, 131 via the control panel 132, with the plasma generator 126, the liquid metal 122 via a connector 134, the mechanism 135 and the sensor 125.

In practice, the plasma generator 126 is brought into the working position above the ingot mold 120, the liquid metal is poured into the mold up to a certain level controlled by the sensor 125, which level defines the width W of the working space between the surface of the liquid metal 122 in the mold and the second (bottom) rim of the main electrode 127. The width W is usually kept within the range of 8 to 10 mm, if the operating voltage is within the range of 60–80 V. For operating voltages higher than 80 V the width is increased and at 170 V, for example, it is 25 mm. After the required width of the working space is adjusted, the power source 130 and the high voltage oscillator 131 are switched on, whereby the auxiliary arc discharge is ignited and maintained until the main plasma arc discharge is initiated and the heat treatment of the metal surface begins. The high voltage oscillator is usually kept on until establishment of the main arc discharge, which is indicated by an electrical current flow corresponding to the power, required for a particular application. For example, at a voltage 170 V a main arc discharge can be achieved with a current of 300 A, which provides for 50 kW of electric power. The height of the main electrode 127 is approximately 40–60 mm for an ingot having the mass of about 20 kg.

The duration of the main arc discharge, i.e. the time required for the heat treatment can be controlled by means of an appropriate timer (not shown). In practice the timer should be suitable for the continuous or periodical actuation of the power source during solidification of the ingot within a mold.

After termination of the heat treatment the plasma arc generator apparatus is switched off and is shifted out of the working position, and upon further cooling the chilled ingot can be released from the mold.

It should be noted, that owing to the steady circulation of the main arc discharge achieved in accordance with the present invention, it is possible to perform the required heat treatment while varying the width of the working space. Thus, if desired, the plasma generator may be provided with means (not shown) for vertically reciprocating the main electrode 127 within the housing 126, thereby adjusting the width of working space W (FIG. 7A). Such a vertical shift may be continuously controlled by the sensor 125 monitoring the level of the liquid metal in the mold, thus ensuring lowering of the electrode 127 in accordance with the metal shrinkage, whereby the treatment which leads to the elimination of defects in the ingots is improved and the amount of waste metal is reduced.

Figure 10:
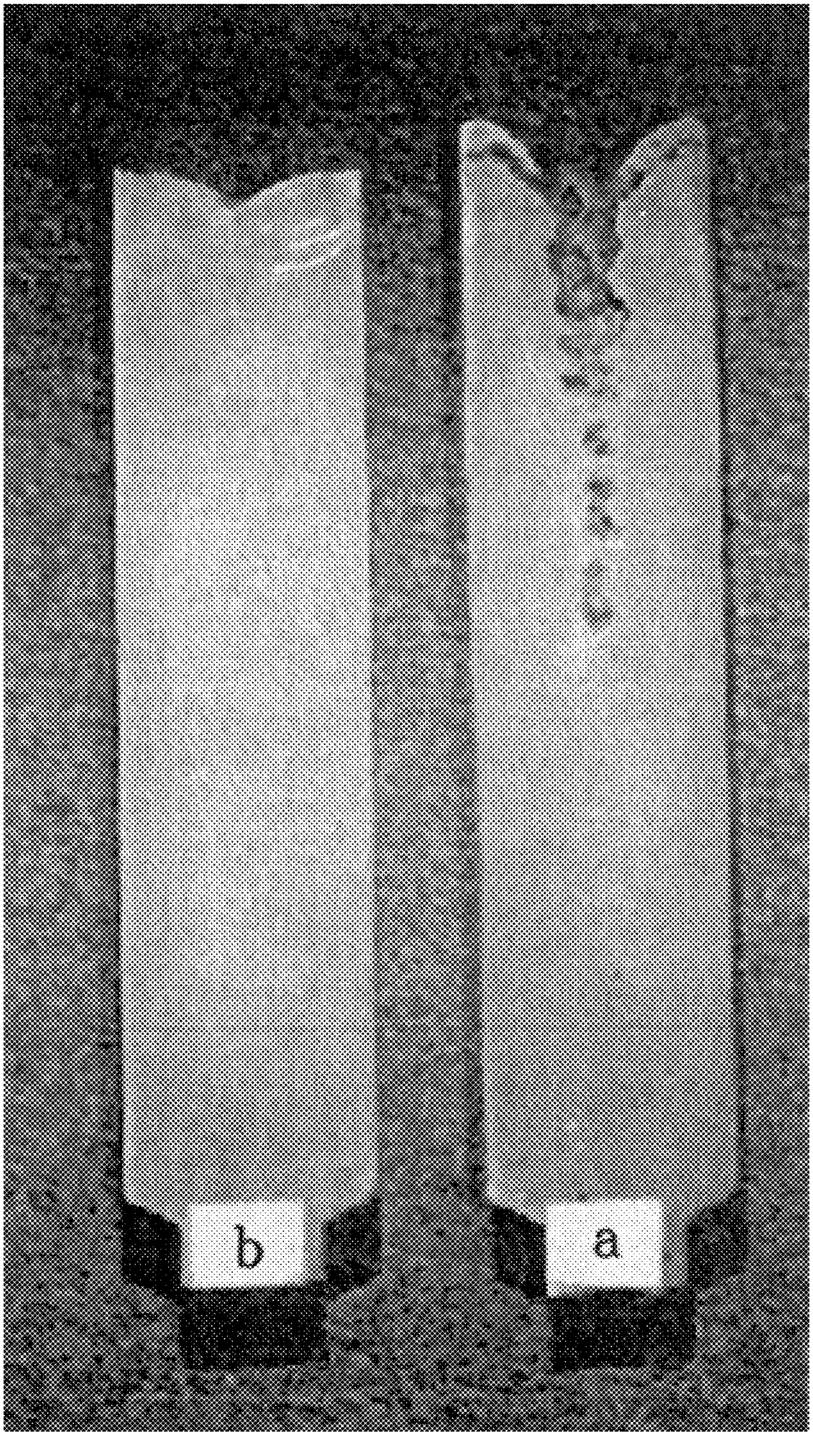
FIG. 10 shows ingots solidified with and without treatment by a circulating plasma arc according to the invention.

The result of a heat treatment according to the invention is illustrated in FIG. 10, which shows photographs of two ingots (a) and (b) from aluminum alloy A332.0 solidified without (a) and with (b) treatment by the circulating plasma arc technique according to the invention. The mass of the ingots is 7.2 kg. The conventional ingot (a) has a blowhole in its upper portion, and consequently a significant layer of the ingot must be cut away by the user. In contrast, the ingot (b), which was subjected during chilling to plasma arc treatment according to the invention for a period of 50 sec, has a smooth upper surface and does not require any additional treatment since it has the required precise dimensions.

We claim:

1. A plasma arc generator electrode (2, 20, 30, 44) which in association with a counter electrode (15, 28, 42, 54, 73, 86, 122) provides a two-rail structure capable of generating a plasma arc discharge displaceable along a closed path in a first direction (14), said plasma arc generator electrode having an electric connector means (13, 23, 37, 45, 53, 93) for connection to a d.c. source of electric power supply (56, 72, 84) and comprises an essentially tubular body with a first rim (3, 24, 33, 89) forming part of a first rim region, and a second, working rim (4, 27, 34, 46, 63, 78, 90) forming part of a second rim region and serving for the electric arc discharge, in which electrode:

(i) said electric connector means include at least one connector site (12) on the plasma arc generator electrode;

(ii) said tubular body has at least one longitudinally extending gap (6, 22, 32, 49, 52, 88) with a first rim region gap stretch (7, 91), a main gap stretch (8) and a second rim region gap stretch (9, 92), each of which gaps divides laterally between two wall sectors (10 and 11; 21 and 21; 31 and 31; 48 and 48), each having first and second rim portions, one of said wall sectors (11, 21, 31 48) carries a connector site associated with the gap;

(iii) the second rim portion of one of said wall sectors has a plasma arc transmitting zone (16, 36) and the second rim portion of the other wall sector carrying said connector site has a plasma arc receiving zone (17, 35), which plasma arc transmitting and receiving zones are separated by and border on the second rim region gap stretch of said longitudinally extending gap, thus forming the two sides of said gap stretch;

(iv) said gap-associated connector site is so located that its projection on a second rim portion is laterally removed from said plasma arc receiving zone in a second direction being opposite to said first direction, whereby in operation a Lorentz force is generated in said two-rail structure causing a plasma arc formed between said plasma arc generator electrode and counter electrode to move uninterruptedly in a closed path in said first direction along said second rim region and across each of said second rim region gap stretches.

2. The electrode according to claim 1, wherein each second rim region gap stretch (9, 92) is so dimensioned as to be essentially not wider than the smallest diameter of an actual plasma arc column; and the distance (L) between said projection of the gap-associated connector site on to a second rim portion and said electric arc receiving zone is essentially not smaller than the largest diameter of the foot of the actual plasma arc column.

3. The electrode according to claim 1, wherein said tubular body of the plasma arc electrode (2, 51, 71, 81) has one single gap (6, 52, 88) and said two wall sectors merge into a single body extending from one side of the gap to another.

4. The electrode according to claim 1, wherein said tubular body has several gaps (22, 32, 49) and several wall sectors (21, 31, 48), each wall sector extending between two gaps.

5. The electrode according to claim 1, wherein in said at least one longitudinally extending gap (6, 22, 52, 88), the said first and second rim region gap stretches (7 and 9, 91 and 92) are non-aligned.

6. The electrode according to claim 5, wherein said main gap stretch (8, 52, 88) has two parts including between them an obtuse angle.

7. The electrode according to claim 5, wherein said at least one longitudinally extending gap (22) is slanted.

8. The electrode according to claim 1, wherein each gap-associated connector site is at or in proximity of the first rim (3, 24, 33, 89) region.

9. The electrode according to claim 1, wherein said second rim (4, 27, 34, 46, 63, 78, 90) region is bevelled.

10. The electrode according to claim 1, wherein the main stretch of said at least one longitudinally extending gap (6, 22, 52, 88) is so shaped that the projection of said gap-associated connector site on a second rim portion is located in that wall sector that holds the electric arc transmitting zone (16, 87).

11. The electrode according to claim 1, wherein the sectors (31, 48) of said essentially tubular body are so designed that the projection of each gap-associated connector site on a second rim portion is located off said closed path.

12. The electrode according to claim 11, wherein the sectors (31) of said essentially tubular body are so designed that the projection of each gap-associated connector site on a second rim portion is located within the perimeter of said closed path.

13. The electrode according to claim 11, wherein the sectors (48) of said essentially tubular body are so designed that the projection of each gap-associated connector site on a second rim portion is located outside the perimeter of said closed path.

14. The electrode of claim 1, wherein the wall sectors (31) of the plasma arc generator electrode according to the invention are so designed that at least the second rim region stretch of each gap is formed by an overlap between adjacent wall sector portions comprising said plasma arc transferring (36) and receiving (35) zones.

15. The electrode according to claim 1, wherein said tubular body (30) has a star-like polyhedral shape and is assembled from a plurality of modular frusto-triangular segments (31) each constituting a wall sector and partially overlapping near the gaps.

16. A plasma arc generator apparatus (50, 70, 80, 126) comprising the plasma arc generator electrode according to claim 1.

17. The plasma arc generator apparatus (70, 80, 126) according to claim 16, wherein said plasma arc generator electrode (71, 81, 127) is capable of cooperating with an electricity conducting substrate (73, 86, 122) serving as the counter electrode and forming together with said plasma arc generator electrode the two-rail structure.

18. The apparatus of claim 17, comprising a cylindrical housing (74, 82) surrounding the said plasma arc generator electrode and spaced therefrom so as to form with it an annular chamber.

19. The apparatus of claim 18, comprising a lid (83) sealing the housing from the end proximal to the first rim of the electrode.

20. The apparatus of claim 18, comprising ignition means (75, 85) mounted within an annular space between said electrode and housing.

21. The apparatus of claim 20, wherein said ignition means are mounted in proximity of said first rim.

22. The apparatus of claim 1, comprising means (132) for axial displacement of the plasma arc generating electrode.

23. A process of heat treatment of a solidifing liquid metal inside a mold, comprising providing a transferable plasma arc generator apparatus (70, 80, 126) having a main electrode (2, 20, 30, 44, 71, 81, 127) for cooperation with an electricity conducting substrate (73, 86, 122) serving as a counter electrode, which main electrode in association with said electricity conducting substrate provides a two-rail structure capable of generating a plasma arc discharge displaceable along a closed path in a first direction (14), which main electrode has electric connector means (13, 23, 37, 45, 93) for connection to a d.c. source of electric power supply (56, 72, 84, 130) and comprises an essentially tubular body with a first rim (3, 24, 33, 89) forming part of a first rim region, and a second, working rim (4, 27, 34, 46, 78, 90) forming part of a second rim region and serving for the electric arc discharge, in said main electrode:

(i) said electric connector means include at least one connector site (12) on the electrode;

(ii) said tubular body has at least one longitudinally extending gap (6, 22, 32, 49, 88) with a first rim region gap stretch (7, 91), a main gap stretch (8) and a second rim region gap stretch (9, 92), each of which gaps divides laterally between two wall sectors (10 and 11; 21 and 21; 31 and 31; 48 and 48) each having first and second rim portions, one of said wall sectors (11, 21, 31, 48) carries a connector site associated with the gap;

(iii) the second rim portion of one of said wall sectors has a plasma arc transmitting zone (16, 36), and the second rim portion of the other wall sector carrying said connector site has a plasma arc receiving zone (17, 35), which plasma arc transmitting and receiving zones are separated by and border on the second rim region gap stretch of said longitudinally extending gap, thus forming the two sides of said gap stretch;

(iv) said gap-associated connector site is so located that its projection on a second rim portion is laterally removed from said plasma arc receiving zone in a second direction being opposite to said first direction, installing said plasma generator so that said second rim is proximal to the surface of the liquid metal (122) at a suitably selected distance therefrom, connecting said main electrode to one pole of the electric power supply (130) and the liquid metal to the other pole thereof, igniting an electric arc, whereby in operation a Lorentz force is generated in a two-rail structure comprising said main electrode and said counter electrode, causing a plasma arc formed between said main electrode and counter electrode to move uninterruptedly in a closed path in said first direction along said second rim region and across each of said second rim region gap stretches;

and continuing the treatment until the liquid metal reaches solidification.

24. The process of claim 23, comprising lowering said plasma arc generating electrode (127) so as to maintain a constant distance between said second rim and the surface of the metal (122) inside the mold.

* * * * *